United States Patent [19]

Aoki

[11] 3,943,219
[45] Mar. 9, 1976

[54] INJECTION BLOW MOLDING METHOD FOR PRODUCING DOUBLE LAYERED HOLLOW ARTICLE

[75] Inventor: Katashi Aoki, Sakaki, Japan

[73] Assignee: Nissei Plastics Industrial Co., Ltd., Japan

[22] Filed: Apr. 23, 1974

[21] Appl. No.: 463,409

[30] Foreign Application Priority Data
Apr. 27, 1973   Japan............................... 48-47230

[52] U.S. Cl.. 264/97; 425/DIG. 209; 425/DIG. 234
[51] Int. Cl.² ........................................ B29C 17/07
[58] Field of Search ............. 264/89, 94, 97, 98, 99, 264/245, 246, 255; 425/242 B, 324 B, 387 B, DIG. 209, 234

[56]   References Cited
UNITED STATES PATENTS

| | | |
|---|---|---|
| 3,091,000 | 5/1963 | Makowski............................ 264/97 |
| 3,113,831 | 12/1963 | Coale................................ 264/94 X |

*Primary Examiner*—Jan H. Silbaugh
*Attorney, Agent, or Firm*—Ostrolenk, Faber, Gerb & Soffen

[57]   ABSTRACT

Injection blow molding method for producing double layered hollow articles, the method being characterized in that the molding of an outer parison and an inner parison by using injection molds, molding of an outer layer from an outer parison by using one blow mold and molding of an inner layer from an inner parison by using the other blow mold which holding an outer layer formed in the preceding cycle, are carried out simultaneously but in different positions in the apparatus.

11 Claims, 8 Drawing Figures

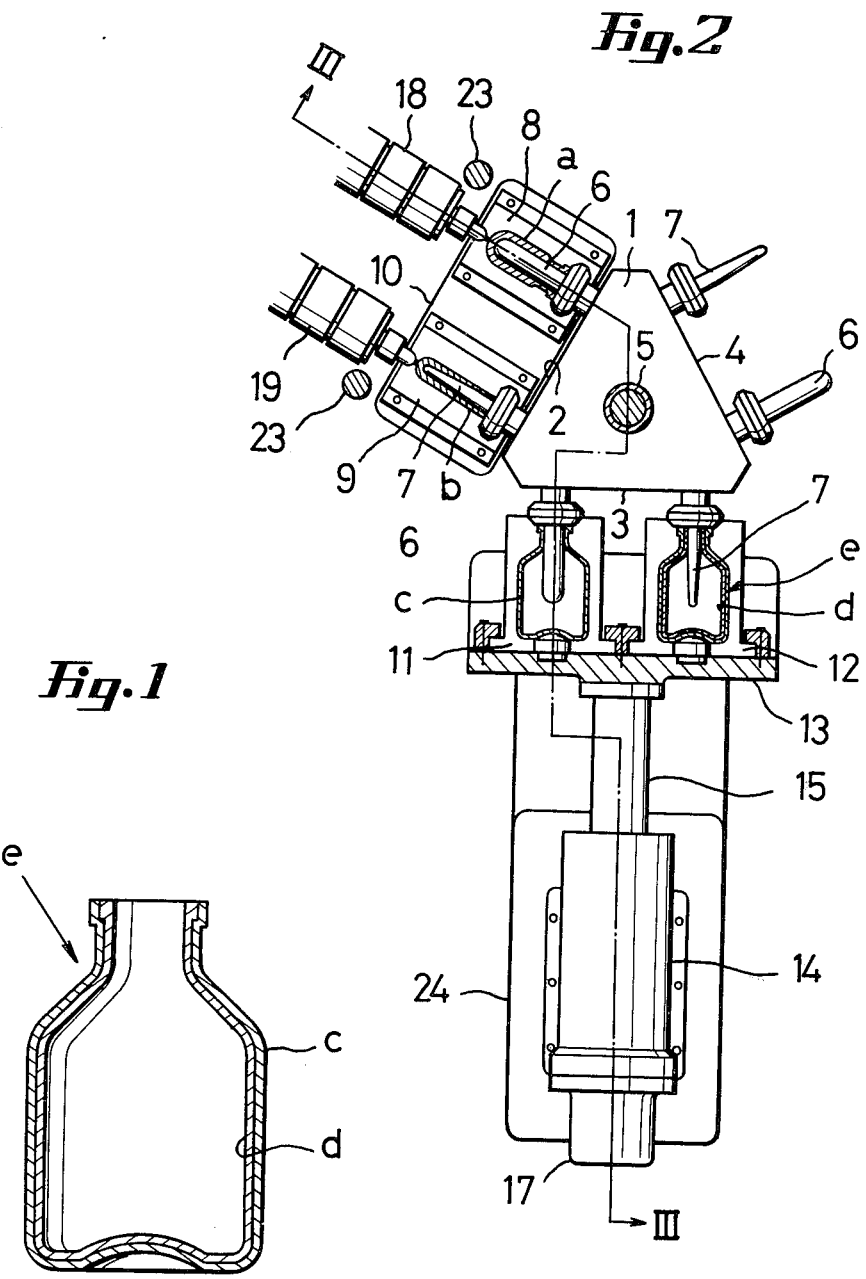

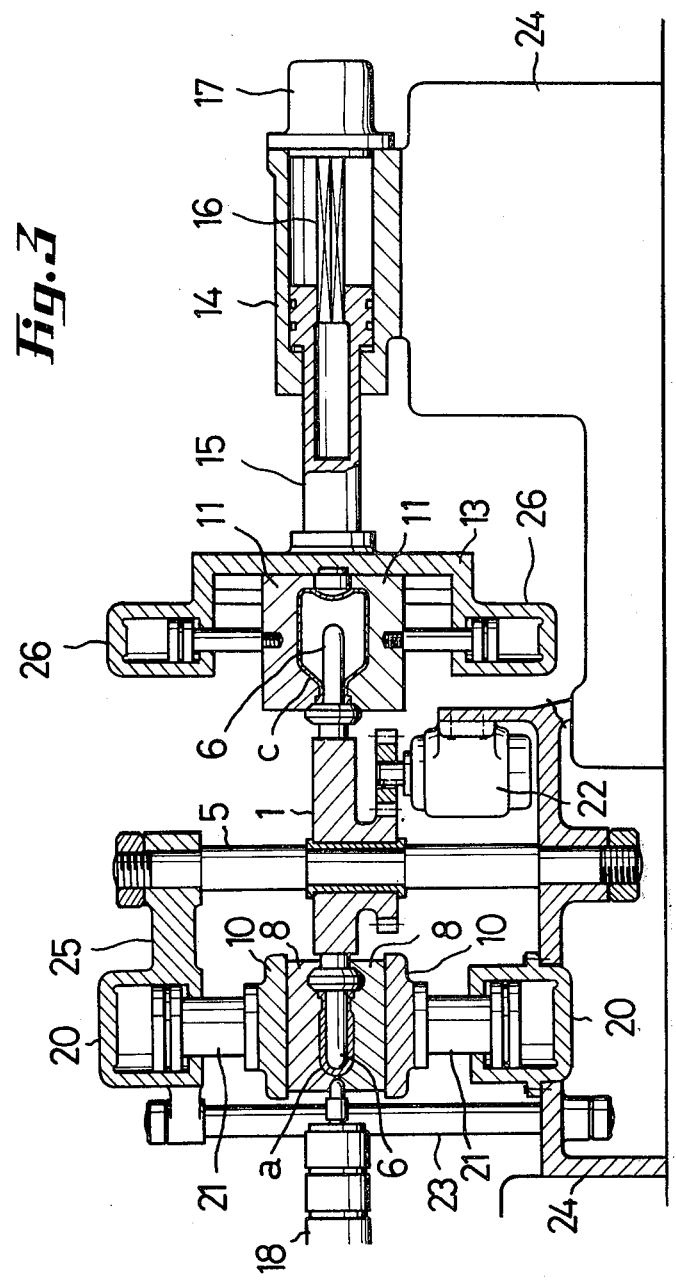

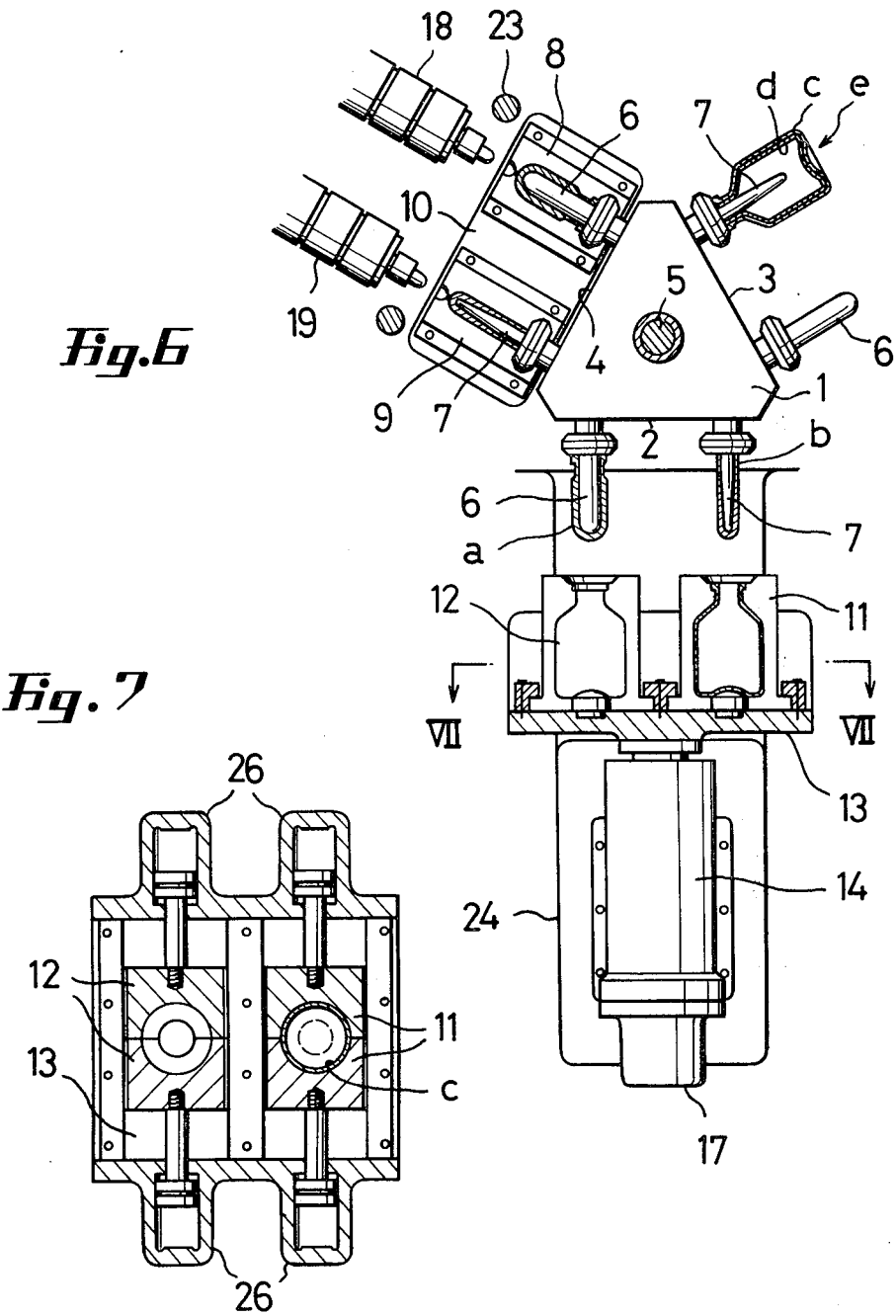

INJECTION BLOW MOLDING METHOD FOR PRODUCING DOUBLE LAYERED HOLLOW ARTICLE

BACKGROUND OF THE INVENTION

This invention relates to an injection blow molding method for producing double layered hollow articles. More particularly, the invention relates to the injection blow molding of double layered hollow articles which are made of two layers of thermoplastic synthetic resins of different kinds or different colors.

In the prior art method, the double parison technique has been employed for obtaining double layered hollow articles in which double layered parison is placed in a blow mold cavity and air is blown into said parison. In order to form the double layered parison, the molten resin is injected molded on the outside of inner parison to form thereon an outer parison. In this stage, however, the outside of said inner parison is fused by the heat and pressure of the injection of the outer parison, and sometimes, the inner parison and outer parison are fused and mixed together to lose the definition between the double layered parison. Especially, the portion of inner parison opposite to the gate is liable to be fused and deformed by the injection pressure, so that the thickness distribution of the inner parison becomes uneven and the thickness of the product through the blow molding process becomes also uneven. Further, in the blow molding process, it is rather difficult to properly blow the double layered parison in like manner as a single layered parison, and the thicker the parison is, the more difficult it becomes to form a hollow article with uniform thickness. And with such uneven thickness product, the characteristic advantages of the double layered structure can not be expected.

BRIEF SUMMARY OF THE INVENTION

In view of the above, the principal object of the present invention is to propose an improved injection blow molding method in order to eliminate the above-mentioned disadvantages.

Another object of the present invention is to propose the injection blow molding method for forming excellent quality hollow articles with simple and reliable process.

According to the present invention, the inner parison and outer parison are separately formed by injection molding and these parisons are blown stepwise in a blow mold to form an integral double layered article. More particularly, the method of the invention comprises the steps of: injection molding of an outer parison and inner parison by a set of injection molds; blow molding of said outer parison by one blow mold in the first position; and further blow molding of said inner parison in said blow mold which contains the blow molded outer layer in the cavity and is positioned in the second position.

In the method of the present invention, these steps are carried out simultaneously but in different positions of the apparatus. Further, after the blow molding of the parisons, the blow mold in the second position is opened to release a double layered product, and both molds in the first and second positions are then rotated for 180° to interchange the positions of said molds with each other and to receive another set of parisons.

Further, the apparatus according to the present invention comprises a turn table having three core supporting walls on the vertical side surfaces thereof; three pairs of cores, each pair of which consists of a thicker core for molding an outer parison and a thinner core for molding an inner parison, and being disposed on each of said supporting walls in parallel to each other; a pair of injection molds which are attached between a pair of mold clamping plates provided along one of said core supporting walls, and cooparating with one pair of said cores; and a pair of blow molds which are attached to a die plate in parallel and separable relation, said die plate can be moved back and forth and rotated, and the positions of said blow molds in the first and second positions can be interchanged by the rotation of said die plate.

BRIEF DESCRIPTION OF THE DRAWINGS

These and other features of the invention will be more fully understood by referring to the following detailed description presented solely for the purpose of illustration and to the accompanying drawings in which:

FIG. 1 is a cross-sectional view of a double layered hollow molded article which is produced according to the method of the present invention;

FIG. 2 is a horizontal cross-section of the main portion of an exemplar apparatus of the present invention;

FIG. 3 is a cross-sectional elevation of said apparatus taken along the line III—III in FIG. 2;

FIG. 6 is a horizontal cross-sectional view of the main portion of said apparatus in a stage of transferring of parisons and a molded article;

FIG. 7 is a cross-sectional elevation of the blow molds taken along the line VII—VII in FIG. 6.

DETAILED DESCRIPTION OF THE INVENTION

Figure 4:
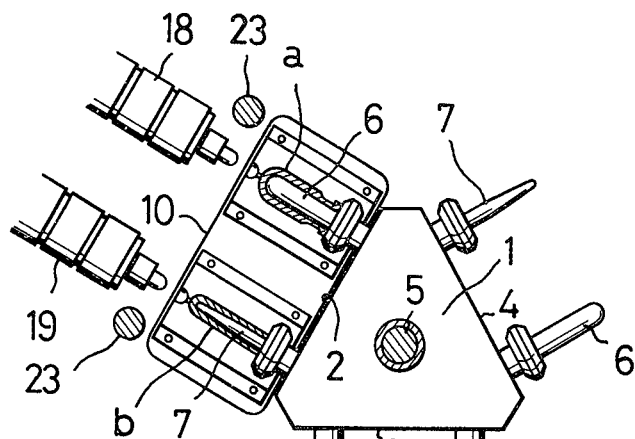
FIG. 4 is a cross-sectional view of the main portion of said apparatus in a releasing stage.

Referring now to the accompanying drawings, especially to FIG. 1, there is shown a bottle *e* which is produced according to the method of the present invention. This bottle has a double layered structure and comprises an outer layer *c* and an inner layer *d* of different kind or different color thermoplastic resins, by which several desirable properties can be obtained by compensating the properties of the layers with each other. For example, the outer layer *c* may be made of relatively hard resin material to impart scratch hardness of the bottle surface and the inner layer *d* may be made of flexible resin so as to give impact strength. Further, any of other combinations of the outer layer and inner layer materials may be possible as far as they are of thermoplastic.

In FIG. 2, the main portion of the apparatus of the present invention is shown, in which the numeral 1 indicates a triangular turn table which has three core supporting walls 2, 3 and 4, and said turn table 1 is provided with a rotatable shaft 5 at the center thereof. Each of said core supporting walls 2, 3 and 4 is provided with each one pair of cores 6 and 7. Said cores 6 and 7 are aligned in parallel to each other and are different in diameter, further they are provided with respective air passages therethrough and blowing holes at the tips of cores.

The above-mentioned one core 6 is used for forming an outer parison *a* which has a larger diameter, and the other core 7 is used for forming an inner parison *b* which has a smaller diameter so as to be inserted into said outer parison *a*. Further, in order to facilitate the releasing of the core 7 after the blow molding, the core 7 is a little tapered.

The numerals 8 and 9 are injection molds for forming the outer parison *a* and inner parison *b*, respectively, and these injection molds 8 and 9 hold said cores 6 and 7 and are attached between a pair of vertically movable mold clamping plates 10 which are disposed along said core supporting wall 2.

The numerals 11 and 12 are blow molds which are attached to a die plate 13. This die plate 13 can be reciprocatingly moved and rotated on the side of said core supporting wall 3. Said blow mold 11 is used for blow molding said outer parison *a* to form the outer layer *c*, and the blow mold 12 is used for blow molding said inner parison *b* where this mold 12 already contains the outer layer *c* which was formed in the preceding cycle. Further, these blow molds 11 and 12 can be vertically separated so as to take out the hollow article *e* as the final product.

The numeral 14 is a hydraulic cylinder which moves and rotates for 180° the above-mentioned die plate 13, and the plunger 15 which is fixed to the center of said die plate 13 is moved by this cylinder 14 and rotated by a hydraulic motor 17 by way of a sequare shaft 16 (see FIG. 3.)

Further, in the drawings, the numerals 18 and 19 are a pair of injection cyclinders to feed the molten resin to the injection molds 8 and 9, respectively, the numeral 20 is a hydraulic cylinder for mold clamping, the numeral 21 is a mold clamping plunger, the numeral 22 is a driving motor for rotating said turn table 1, the numeral 23 is a tie rod for connecting the machine bed 24 and the upper stationary plate 25, and the numeral 26 is a hydraulic cylinder for moving the blow molds 11 and 12.

In the following, the injection blow molding method of the present invention by using the above-mentioned apparatus will be explained.

The method of injection blow molding of the present invention comprises the steps of injection molding of the outer parison *a* and the inner parison *b*, blow molding of said outer parison *a* to form an outer layer *c*, and blow molding of said inner parison *b* within said outer layer *c* to form a double layered product *e*. In practice, the above steps can be carried out simultaneously by shifting the parison in turn by using the turn table 1.

Figure 5:
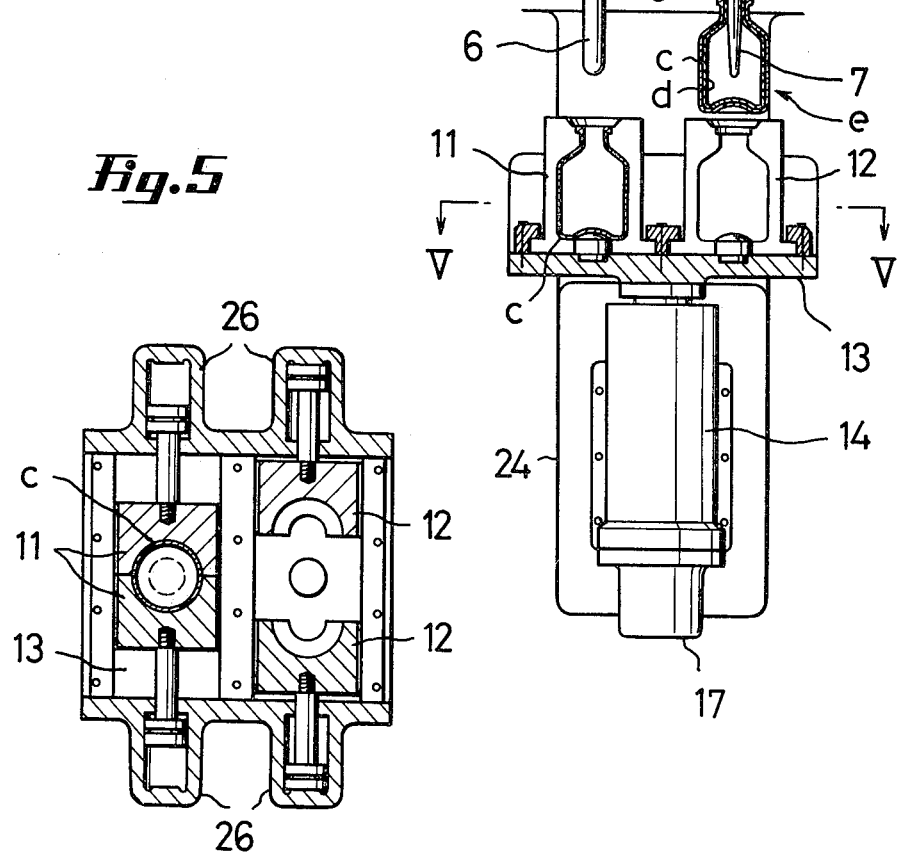
FIG. 5 is a cross-sectional elevation of the blow molds taken along the line V—V in FIG. 4.

As shown in FIG. 2, the outer parison *a* and the inner parison *b* are injection molded by the molds 8 and 9, and at the same time, the parisons which were made in the preceding cycle are subjected to blow molding to form the outer layer *c* and the inner layer *d* by the blow molds 11 and 12. After this step, the releasing of parison *a* and parison *b* and the product *e* may be carried out as shown in FIGS. 4 and 5.

The above-mentioned releasing of parisons *a* and *b* can be carried out in like manner as the conventional case, that is, after retracting the injection cylinders 18 and 19, the injection molds 8 and 9 are opened to the vertical directions. While, in the blow molds 11 and 12, only the latter mold 12 in the second position is opened to the vertical directions, further the die plate 13 is retreated, thus the core 6 is drawn out from the blow mold 11 in the first position which hold the outer layer *c* in the closed cavity, and the core 7 together with the product *e* is released from the blow mold 12 in the second position (see FIG. 4).

As disclosed in the above, when the pairs of cores 6 and 7 are released from the molds, 8, 9, 11 and 12, the turn table 1 is rotated counterclockwise for 120 degrees on the shaft 5 to shift the core supporting walls 2, 3 and 4 by one step, at the same time, the die plate 13 at the retracted position is rotated for 180 degrees, thereby the blow mold 11 in the first position which holding the outer layer *c* and the other blow mold 12 in the second position from which the product *e* is removed, are interchanged as shown in FIG. 6.

Figure 8:
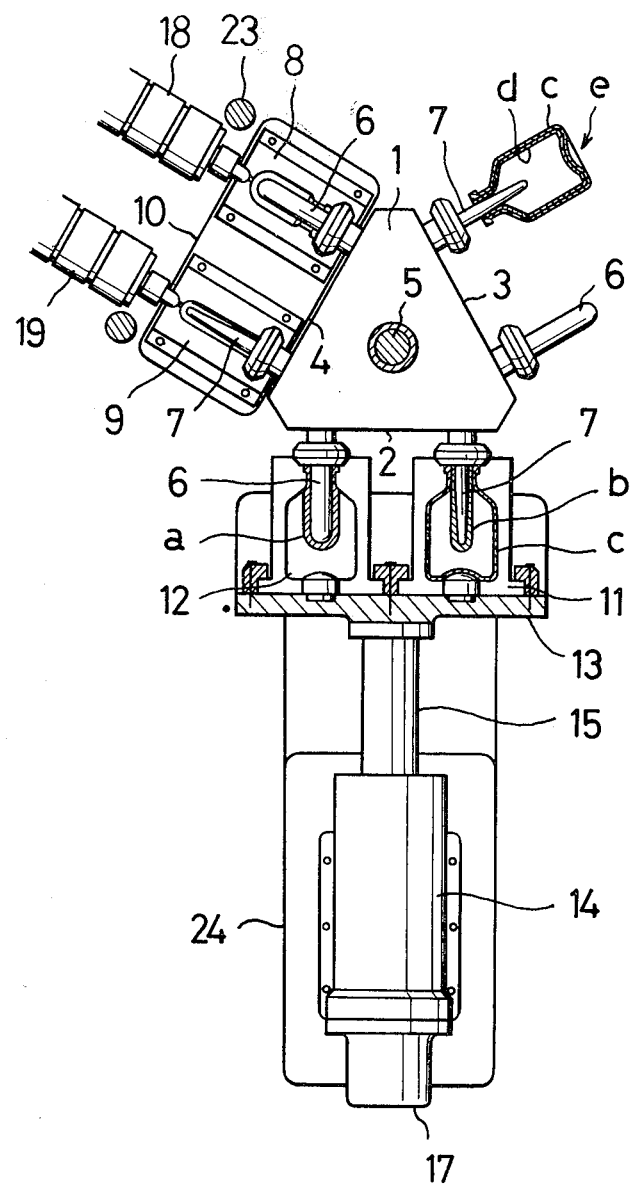
FIG. 8 is a horizontal cross-sectional view of the main portion of said apparatus in the injection molding of parisons.

Then, the above-mentioned injection mold 8 and 9 are closed, and the parisons *a* and *b* on the cores 6 and 7 are inserted into the blow molds 12 and 11 by advancing the die plate 13, and further the blow mold 12 which are shifted to the first position is closed as shown in FIGS. 7 and 8. Further, the injection molding of the parisons in the injection molds 8 and 9 and the blow molding of the transferred parisons *a* and *b* in the blow molds 11 and 12 are carried out as shown in FIG. 1 to produce the outer layer *c* of the hollow article and the product *e*, thus one cycle of the molding process is completed.

By the way, the air between the outer layer *c* and the inner layer *d* can be driven out by providing screw threads or longitudinal grooves onto the neck portion of the inner parison *b*.

In the method of the present invention as disclosed in the above, the parison *a* for the outer layer *c* and the parison *b* for the inner layer *d* are molded separately, and the parisons *a* and *b* are thereafter subjected to the blow molding also separately, however, these molding steps can be carried out simultaneously. Therefore, any defects caused in the conventional double layered parison method can be eliminated. And the operation of the blow molding is very easy in like manner as the single layer blowing because the blow molding of the two parisons are carried out separately, in addition, the distribution of thickness of the product becomes uniform. Still further, as the inner layer is blown in the outer layer, the two layers can be tightly bonded by the pressure of blow molding.

It should be emphasized, however, that the specific embodiments described and shown herein are intended as merely illustrative and in no way restrictive of the invention.

What is claimed is:

1. A method for injection blow molding a series of double layered articles, comprising the steps of:
    a. injection molding an outer parison about a first one of a pair of core pins;
    b. injection molding an inner parison about a second one of the pair of core pins;
    c. providing an outer layer of a first article within a first one of a pair comprising first and second identical blow molds;
    d. moving the pair of first and second core pins with their respective outer and inner parisons to a position in front of the respective second and first ones of the pair of blow molds;
    e. enclosing the first core pin and outer parison within the second blow mold;
    f. enclosing the second core pin with the inner parison within the outer layer provided in the first blow mold;

g. blow molding an outer layer of another article from the outer parison enclosed in the second blow mold;

h. blow molding an inner layer of the first article from the inner parison enclosed within the outer layer provided in the first blow mold, the inner layer substantially totally in contact with an interior surface of the outer layer;

i. withdrawing both the first and second core pins from the respective second and first blow molds;

j. releasing a finished double layered article from the first blow mold;

k. moving the now-empty first blow mold to the position previously occupied by the second blow mold; and l. moving the second blow mold to the position previously occupied by the first blow mold, the second blow mold containing the outer layer of another article formed from the outer parison injection molded about the first core pin to provide an outer layer for the next double layered article to be formed.

2. A method as set forth in claim 1 wherein step (c) comprises the steps of injection molding an initial outer parison about a first one of another pair of first and second core pins; moving the first one of the another set of core pins to a position in front of an empty first one of the pair of first and second blow molds; enclosing the initial outer parison in the first blow mold; forming an outer layer of an initial article from the enclosed another outer parison in the first blow mold; and withdrawing the first one of the another pair of core pins from the first blow mold to provide the outer layer of a first article within the first blow mold.

3. A method as set forth in claim 1 wherein steps (a) and (b) are performed simultaneously.

4. A method as set forth in claim 1, wherein steps (e) and (f) are performed simultaneously.

5. A method as set forth in claim 1, wherein steps (g) and (h) are performed simultaneously.

6. A method as set forth in claim 1, wherein steps (k) and (l) are performed simultaneously.

7. A method as set forth in claim 6, wherein steps (k) and (l) further comprise the steps of affixing the first and second blow molds at equal distances from the axis of rotation of a rotatable member; and rotating the member 180° about the axis of rotation, whereby the first blow mold containing the first outer layer is moved to postion previously occupied by the second blow mold, the empty second blow mold being rotated to the position previously occupied by the first blow mold.

8. A method for injection blow molding a series of double layered articles; comprising the steps of:

a. simultaneously injection molding a first parison and a second parison;

b. providing a formed first layer for a first article in a first mold;

c. moving both the first and second parisons to respective positions adjacent to the first mold and a second mold;

d. positioning the first parison within a portion of the volume of the first mold unoccupied by the provided first layer;

e. positioning the second parison within the second mold;

f. blow molding a second layer for the first article from the first parison within the first mold; the second layer substantially completely attached to the provided first layer;

g. blow molding another first layer for a second article from the second parison within the second mold;

h. releasing a finished first double layer article from the first mold;

i. moving the first mold to a position previously occupied by the second mold to receive a next provided first parison for a second article;

j. moving the second mold to a position previously occupied by the first mold to receive a next provided second parison for a second article; and k. repeating steps (a) through (j) to mold the series of double layered articles.

9. A method as set forth in claim 8, wherein steps (f) and (g) are performed simultaneously.

10. A method as set forth in claim 9, wherein steps (d) and (e) are performed simultaneously.

11. A method as set forth in claim 10, wherein steps (i) and (j) are performed simultaneously.

* * * * *